United States Patent [19]

Yoshida et al.

[11] 3,984,288

[45] Oct. 5, 1976

[54] METHOD FOR TREATMENT OF RUBBER AND PLASTIC WASTES

[75] Inventors: Masaaki Yoshida; Masao Watanabe; Kimio Tohma; Mitsuhiko Noda, all of Osaka, Japan

[73] Assignee: Sumitomo Electric Industries, Ltd., Osaka, Japan

[22] Filed: Oct. 4, 1974

[21] Appl. No.: 512,799

[52] U.S. Cl. .................................. 201/2.5; 48/209; 201/25; 202/113; 202/209
[51] Int. Cl.² .................. C10B 53/00; C10B 57/04
[58] Field of Search ................ 201/2.5, 25; 202/96, 202/108, 118; 48/76, 111, 113, 209; 260/2.3; 264/29; 208/8

[56] References Cited

UNITED STATES PATENTS

| | | | |
|---|---|---|---|
| 1,484,257 | 2/1924 | Fenton | 202/262 X |
| 2,838,801 | 6/1958 | DeLong et al. | 260/2.3 X |
| 3,010,882 | 11/1961 | Barclay et al. | 264/29 |
| 3,362,887 | 1/1968 | Rodgers | 201/25 |
| 3,697,256 | 10/1972 | Engle | 48/111 UX |
| 3,772,242 | 11/1973 | Liska et al. | 260/2.3 X |
| 3,804,811 | 4/1974 | Rose et al. | 260/2.3 X |
| 3,832,151 | 8/1974 | Kitaoka et al. | 48/111 |
| 3,843,339 | 10/1974 | Saito | 48/209 |

*Primary Examiner*—Morris O. Wolk
*Assistant Examiner*—Michael S. Marcus
*Attorney, Agent, or Firm*—Sughrue, Rothwell, Mion, Zinn and Macpeak

[57] ABSTRACT

A method for the treatment of rubber and plastic wastes, comprising in series the steps of 1. heating and melting rubber and plastic wastes at a temperature ($T_1$) to extrude the molten wastes with one or a plurality of extruders into one or a plurality of decomposing zones,
2. heating the molten wastes in the decomposing zone at a higher temperature ($T_2$) than the heating temperature ($T_1$) in the extruder to prepare decomposed products while optionally separating residues therefrom,
3. introducing the decomposed products into a dry-distilling zone while optionally heating the separated residues in a residue removal zone at an even higher temperature ($T_3$) than the heating temperature ($T_2$) in the decomposing zone to remove the residues from the residue removal zone when residues are separated in the decomposing zone,
4. heating the decomposed products in the dry-distilling zone at a lower temperature ($T_4$) than the heating temperature ($T_2$) in the decomposing zone to gasify the products by dry-distillation, and
5. cooling the dry-distilled products in a cooling zone to separate liquid materials from gaseous materials; and an apparatus for treatment of rubber and plastic wastes, comprising in series
   1. an extruder or a plurality of extruders for heating and melting rubber and plastic wastes to extrude the molten wastes, each extruder being connected with a decomposing means in series,
   2. a decomposing means or a plurality of decomposing means for heating the molten wastes to prepare decomposed products while optionally separating residues therefrom, each decomposing means being connected with the above extruders in series,
   3. a dry-distilling means for gasifying the decomposed products by dry-distillation, and
   4. a cooling means for cooling the dry-distilled products to separate gaseous materials from liquid materials, the decomposing means being optionally provided with a residue removal means as a ranch at the outlet thereof, for removing the residues from the decomposing means after the decomposed products contained in the residues have been separated therefrom, with the temperatures of each of the extruders, the decomposing means, the dry-distilling means and the residue removal means being controllable individually.

15 Claims, 6 Drawing Figures

METHOD FOR TREATMENT OF RUBBER AND PLASTIC WASTES

BACKGROUND OF THE INVENTION

1. Field of the Invention

This invention relates to a method for treatment of rubber and plastic wastes and apparatus therefor, and in particular, to a method for liquefying the wastes by pyrolysis and apparatus therefor.

2. Description of the Prior Art

Two conventional liquefying processes are known for treatment of rubber and plastic wastes. One process comprises heating and melting the rubber and plastics, feeding the molten substances to a pyrolysis reaction furnace and decomposing and dry-distilling the molten substances at the same time in the reaction furnace to liquefy the decomposed products. The other process comprises feeding the plastics directly to a pyrolysis reaction furnace and heating and melting the plastics therein using a heat transfer duct or the like with a simultaneous decomposition and dry-distillation thereof employing the molten substances as a heat transfer medium thereby to liquefy the decomposed products. In these conventional processes, the temperature in the heating means is almost uniform as a whole including the decomposing means and the dry-distilling means. This is, however, somewhat defective for the following reasons. If the temperature is to be elevated in order to accelerate the decomposition speed, the temperature must be elevated in the all of the pyrolyzing means. However, rubber and plastics themselves have poor thermal conductivity, and therefore it is difficult to elevate the temperature in the pyrolyzing means easily. Accordingly, a specific heater which can elevate the temperature in the pyrolysis means much higher than is required or a lot of heaters must be used therefor. Various trials have heretofore been effected in an effort to accelerate the decomposition speed and to improve the decomposition efficiency but no effective means have as yet been found. According, generally in the conventional processes, the pyrolysis is carried out for a long period of time at a temperature of 400° to 500°C. In order to treat a large amount of wastes, pyrolysis of the wastes for a long period of time in an apparatus provided with a large-sized decomposing trough has been suggested.

Moreover, conventional processes are further defective in that the pyrolyzed products are not uniform, and oils having quite different properties are recovered and obtained. The properties of the recovered oils vary widely in the treatment of any rubber and plastic materials, and the recovered oils comprise various kinds of components of an extensively broad range of from a light fraction having a fairly low flash point to waxes having a high pour point.

SUMMARY OF THE INVENTION

An object of this invention is to obtain recovered oils having uniform properties in the treatment of rubber and plastic wastes.

Accordingly, this invention provides a method for continuously pyrolyzing and liquefying rubber and plastic wastes and an apparatus therefor where the decomposition speed and the decomposition efficiency are accelerated and improved using three separate means of a heating and melting means, a decomposing means and a dry-distilling means. In the method and apparatus of this invention, an extruder is used as the heating and melting means, the decomposing means includes a heating and melting means and a decomposing duct in which the temperature is higher than that in the dry-distilling means, and the dry-distilling means includes a dry-distilling trough, and the melting means, decomposing means and dry-distilling means are disposed in series for continuous operation and are so constructed that the temperature of the respective means can be controlled individually.

BRIEF DESCRIPTION OF THE ACCOMPANYING DRAWINGS

FIGS. 1 to 6 are schematic views of the embodiments of the apparatus according to the present invention.

DETAILED DESCRIPTION OF THE INVENTION

This invention is explained in detail hereinafter with reference to drawings attached hereto.

Figure 1:
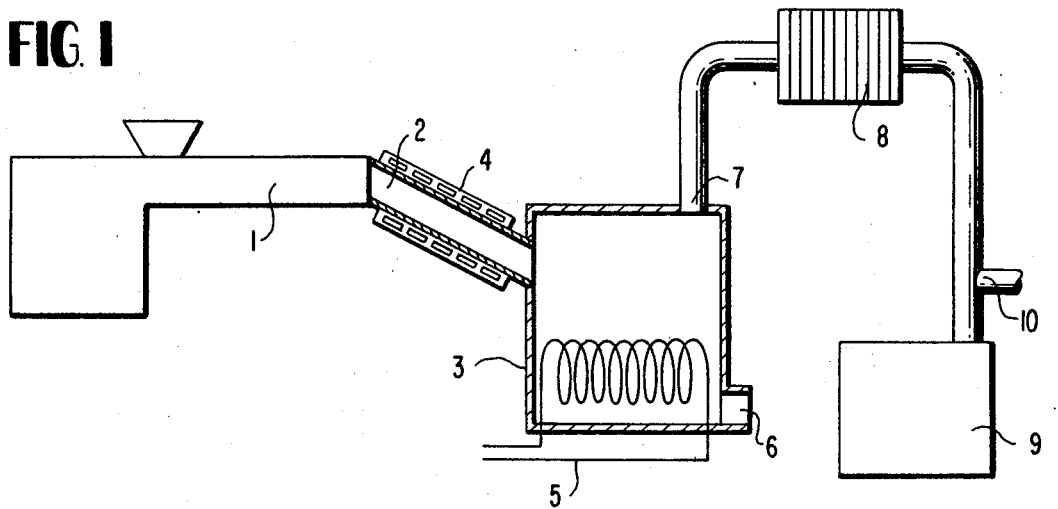

In FIG. 1, element 1 is an extruder where rubber and plastic wastes are kneaded and melted to continuously extrude the molten substances into a heating and decomposing duct 2. In the duct 2, the heating temperature is controlled at a temperature higher than the temperature in the extruder 1 and a dry-distilling trough 3. The trough 3 is connected with the duct 2, and the decomposed products are fed into the trough 3 through the duct 2, and then the decomposed products are successively gasified by dry-distillation in the trough 3. Element 4 is a heater for heating the decomposing duct. As shown, 5 is a heater for heating the dry-distilling trough. Various means can be utilized for heating the extruder, decomposing duct and dry-distilling trough, such as a band-heater, a cast heater, a high frequency induction heating means, an oil heating means, a steam heating means, a hot-air heating means and a gas heating means. The means for heating the extruder, decomposing duct and dry-distilling trough are appropriately selected, depending upon the kinds of rubber and plastic wastes to be treated or the temperature in these means to be heated. A band-heater, cast heater, gas heating means and hot-air heating means are preferred for heating the decomposing duct, and an oil heating means, steam heating means and hot-air heating means are preferred for heating the dry-distilling trough.

These means are so constructed that the temperature of each means can be controlled individually. The individual controlling means are different in accordance with the heating means employed. Outlets 6 for removing the decomposed residues and 7 for expelling gaseous products after dry-distillation are shown in the FIGURES.

The dry-distilled gaseous products removed from the dry-distilling trough 3 are cooled to ambient temperature, by passage through a conventional cooling trough 8 or a condenser, whereby liquid products and products gaseous at ambient temperature are separated from each other, and then the liquid products are retained in an oil tank 9. The gaseous products are introduced into a gas holder, passing through an outlet 10 for removing the gaseous products.

If the gaseous products contain hydrogen chloride gas from the decomposition of, e.g., vinyl chloride, etc., the gaseous products preferably are introduced into a known absorbing tower to absorb the hydrogen chloride therein. Afterwards, the small amount of residual hydrochloric acid formed in the absorption is neutralized with an alkali in a neutralizing tower or the like, and then only a pure hydrocarbon gas is placed in the gas holder. The gaseous products can be used as a heat source for the decomposition, and these are released into the air after perfect combustion. In addition, when liquid products having more uniform properties are to be obtained, the gaseous products are introduced to a fractionating tower or the like from the outlet 7 to fractionate them into uniform components.

The extruder 1 used in this invention can be any conventional extruder for rubber and plastics. For example, a single spindle screw-type extruder, a double spindle screw-type extruder, a single spindle two-stage screw-type extruder, and a double spindle two-stage screw-type extruder can be employed.

The rubber and plastic waste raw materials are fed into the extruder 1, and the waste materials can be pre-worked prior to the feeding thereof into the extruder 1, to pulverize ethe materials to almost the same sizes (about 5 to 10 mm). Some waste materials are pre-heated and then fed into the extruder in a semi-molten state. Other waste materials are fed into the extruder in a block or sheet form.

The temperature in the extruder is varied depending upon the raw materials fed into the extruder, but is is necessary to elevate the temperature in the extruder so that the materials can fully be kneaded and melted and to keep the temperature so that the molten materials remain melted.

The temperature in the heating and decomposing duct 2 is controlled to a temperature higher than the temperature in both of the extruder and the dry-distilling trough, and the temperature is varied depending upon the raw materials sent from the extruder. If the temperature in the heating and decomposing duct is lower than the temperature in the extruder and the dry-distilling trough, it is impossible to obtain liquid products having uniform properties, as shown in the following Comparative Examples. In addition, the temperature in the heating and decomposing duct also is varied depending upon the amount of materials sent from the extruder. In any event, it is necessary to elevate the temperature in the heating and decomposing duct so that the molten resins can be decomposed at a sufficient rate and to maintain the temperature as such for a sufficient period of time until the decomposition of the molten resins is completed.

The temperature in the dry-distilling trough is elevated so that the decomposed products can be dry-distilled and gasified completely.

The continuous heating and decomposing treatment preferably is carried out at temperatures each falling within the following ranges:

Temperature in the extruder: lower than about 100° to 400°C

Temperature in the decomposing duct: about 400°C or more to 1000°C

Temperature in the dry-distilling trough: lower than about 100° to 400°C

According to the present invention, it is possible to liquefy various kinds of rubber and plastic composition wastes, for example, as follows:

Polyolefin resin compositions and crosslinked products thereof, such as low density polyethylene, high density polyethylene, polypropylene, ethylene-vinyl acetate copolymers, ethylene-ethyl acrylate copolymers, polybutene and ethylenebutene copolymers; polystyrene resin compositions such as polystyrene, styrene-acrylonitrile copolymers and acrylonitrile-butadiene-styrene copolymers (ABS resin); vinyl and vinylidene resin compositions such as polyvinyl chloride, polyvinyl alcohol, polyvinyl acetate, vinyl chloride-vinyl acetate copolymers, and polyethylene-vinyl acetate copolymers; polyacrylic resin compositions such as polymethylacrylate and polymethylmethacrylate; polyamide resin compositions such as nylon 6, nylon 66 and nylon 610 copolymers, rubber compositions such as natural rubber, butadiene rubber, butyl rubber, isoprene rubber, styrene-butadiene rubber and ethylene-propylene rubber.

In order to effectively carry out the method of this invention to improve the decomposition efficiency and to increase the amount of middle component obtainable from decomposed products, it is advantageous to feed an active gas into the above decomposing means, which is another embodiment of this invention.

Figure 2:
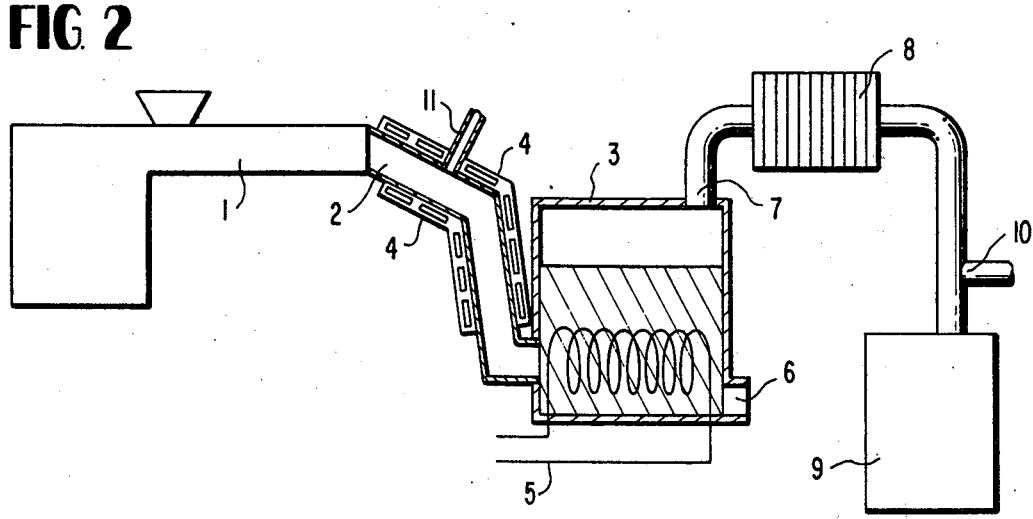

With reference to FIG. 2, the heating and decomposing duct 4 includes an inlet 11 for feeding an active gas, and an active gas capable of easily reacting with the olefins of the rubber and plastic decomposed products, such as olefins of the rubber and plastic decomposed products, such as oxygen, hydrogen, ozone or air, is fed from the inlet 11. The amount of the active gas fed is varied depending upon the kinds of rubber and plastic compositions decomposed and the amount of compositions sent from the extruder to the heating and decomposing duct.

By carrying out the heating and decomposition of waste materials while feeding an active gas into the decomposing means, it is possible to obtain recovered oils with more uniform properties and to reduce the content of the olefins in the fractions obtained thereby to deodorize the fractions.

Some deposits often remain in the heating and decomposing duct 2 and the dry-distilling trough 3 as the treatment of wastes according to the method of this invention progresses, and it is advantageous to remove these deposits to improve the decomposition efficiency. This invention also includes still another embodiment where the deposits or residues are removed from the heating and decomposing duct 2.

When polyethylene wastes are treated according to the present invention, some wastes include about 3% or so of carbon, and the carbon is in general deposited in the dry-distilling trough.

When the wastes treated are crosslinked polyethylene, polystyrene and ethylene-vinyl acetate copolymers, a metal oxide such as aluminum oxide or silicon oxide is admixed the wastes in an appropriate proportion of about 1 to 200 parts per 100 parts by weight of the wastes for the purpose of accelerating the decomposition of the wastes and deodorization, and in this case, a large amount of residues mainly of the metal oxide used is deposited in the dry-distilling trough. When the residues of carbon or metal oxides deposited in the dry-distilling trough are removed therefrom, decomposed products are also removed together with the residues, causing a deterioration of the decomposition efficiency.

This invention is free from this defect, and the decomposition rate and the decomposition efficiency can be accelerated and improved, and recovered oils with uniform properties can be obtained.

More precisely, this invention further provides an improved method for treatment of rubber and plastic wastes and an apparatus therefor, comprising 1. heating and melting rubber and plastic wastes at a temperature ($T_1$) to extrude the molten wastes with an extruder to a decomposing means, 2. heating the molten wastes in the decomposing means at a higher temperature ($T_2$) than the heating temperature ($T_1$) in the extruder to separate decomposed products and residues from each other, 3. introducing the decomposed products into a dry-distilling means while heating the residues in a residue removal means at an even higher temperature ($T_3$) than the heating temperature ($T_2$) in the decomposing means to remove the residues from the residue removal means, 4. heating the decomposed product in the dry-distilling means at a lower temperature ($T_4$) than the heating temperature ($T_2$) in the decomposing means to gasify the products by dry-distillation, and 5. cooling the dry-distilled products in a cooling means to separate the liquid materials from the gaseous products.

This embodiment of the present invention will be explained in detail with reference to drawings attached hereto.

Figure 3:
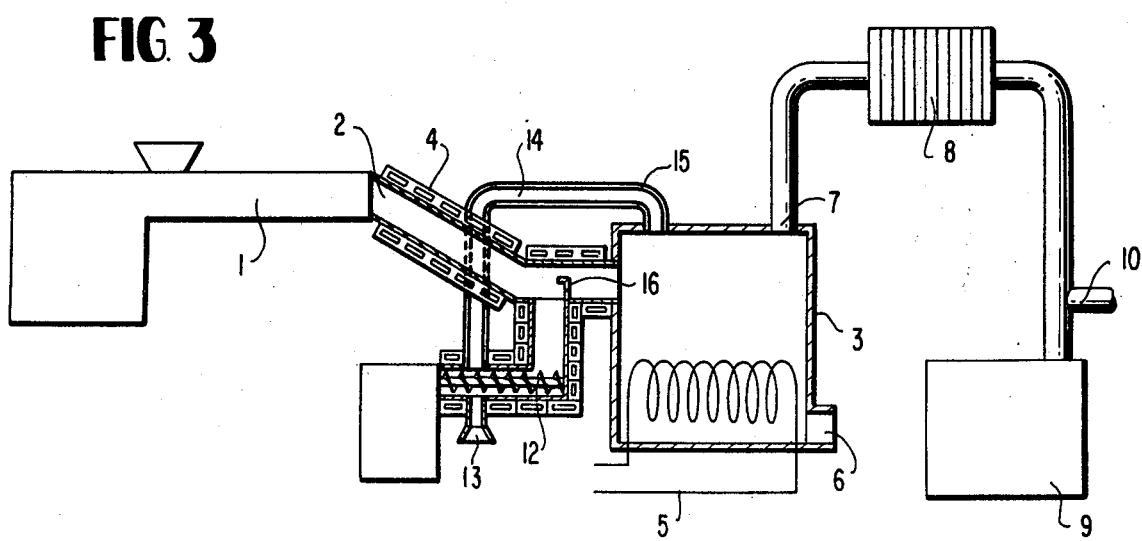

In FIG. 3, element 1 is an extruder where rubber and plastic wastes are kneaded and melted and the molten wastes are continuously successively extruded into a heating and decomposing duct 2. The heating temperature ($T_2$) in the duct 2 is controlled to a temperature higher than the heating temperature ($T_1$) in the extruder and the heating temperature ($T_4$) in the dry-distilling trough 3.

The dry-distilling trough 3 is connected with the duct 2, duct 13 is an outlet for removing residues, and this outlet is branched in the vicinity of the outlet of the duct 2 and is connected with an extruder 12. In the following Examples, this outlet 13 is provided facing downward. For example, when the residues are metal oxides which are intermixed in a large amount, these are introduced into the extruder 12 by a weir 16 and fall due to gravity, and the decomposed products which were substantially separated in the heating and decomposing duct 2 are mostly gasified and introduced into the dry-distilling trough 3. Since the heating temperature ($T_3$) in the residue removal means 13 and the extruder 12 is controlled to a temperature higher than the heating temperature ($T_2$) in the heating and decomposing duct 2, decomposed products contained in the residue which are still not separated are gasified in the extruder 12 and introduced into the dry-distilling trough 3 via a duct 14 provided with a bandheater 15. Thus, only residues which are substantially free from decomposed products are continuously exhausted to the outside by the extruder 12. In the following Examples, the residues are transferred to the driving side from the top end of the extruder 12. The extruder can be a simple extruder. Some wastes contain a small amount of residues, and when the amount of residues is small, a pole bulb or a gate bulb can be used in place of the extruder 12 to intermittently exhaust the residue.

The temperature in the extruder is varied depending upon the raw materials fed thereinto, but it is necessary to elevate the temperature therein so that the materials can fully be kneaded and melted and to maintain the temperature so that the molten materials remain melted.

The temperature in the heating and decomposing duct 2 is controlled to a temperature higher than the temperature in both the extruder and the dry-distilling trough, and this is varied depending upon the raw materials sent from the extruder. If the temperature in the heating and decomposing duct is lower than the temperature in the extruder and the dry-distilling trough, it is impossible to obtain liquid products having uniform properties. In addition, the temperature in the heating and decomposing duct also is varied depending upon the amount of materials sent from the extruder. In any event, it is necessary to elevate the temperature in the heating and decomposing duct so that the molten resins can be decomposed at a sufficient rate and to keep the temperature as such for a sufficient period of time until the decomposition of the molten resins is completed.

The heating temperature ($T_3$) in the residue removal outlet 13 and the extruder 12 is controlled to a temperature higher than the heating temperature ($T_2$) in the heating and decomposing duct 2 whereby the decomposed products contained in residues still not yet separated therefrom are sent to the dry-distilling trough 3. Thus, the efficiency for separation is improved further.

The temperature in the dry-distilling trough is elevated so that the decomposed products can be completely dry-distilled and gasified.

It is preferred to carry out the continuous heating and decomposing treatment at temperatures each falling within the following range:

Temperature ($T_1$) in extruder 1 = lower than about 100° to 400°C

Temperature ($T_2$) in decomposing duct 2 = about 400°C or more to 1000°C

Figure 4:
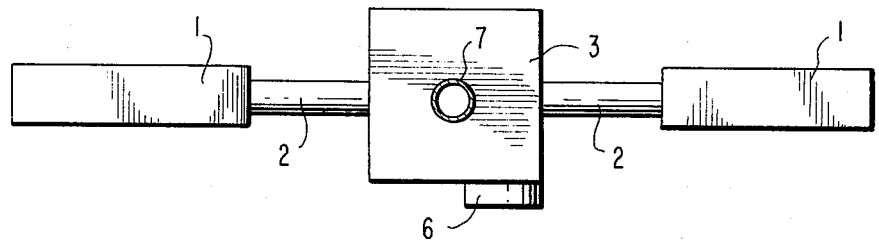
Figure 5:
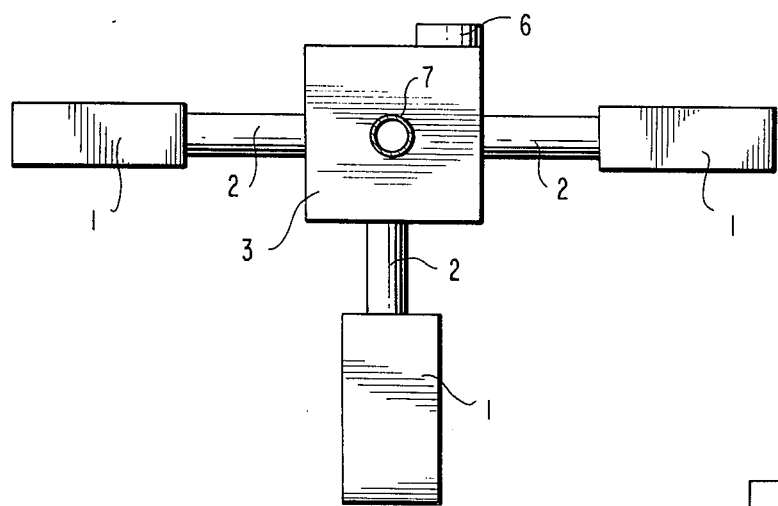
Figure 6:
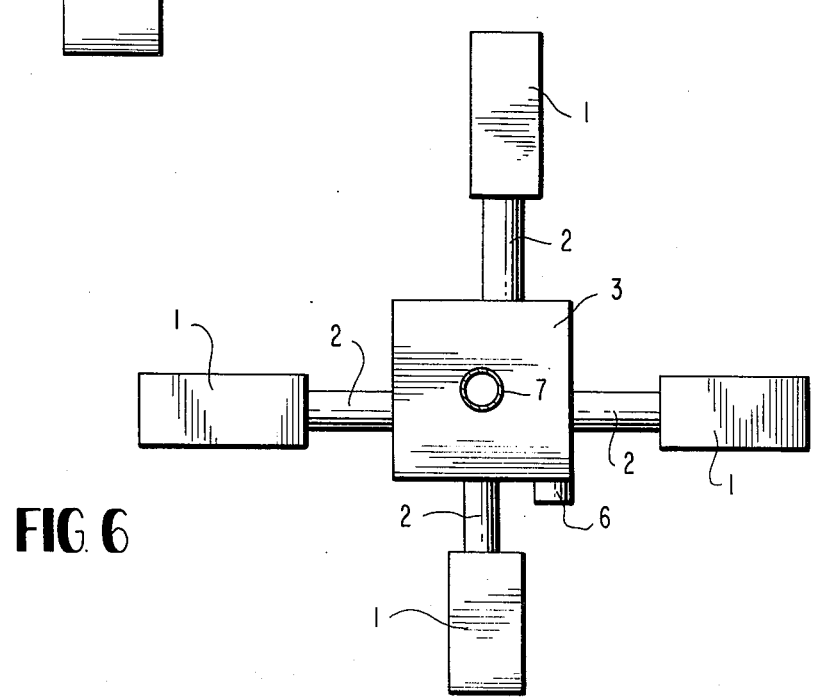

Temperature ($T_3$) in residue removal outlet 13 and extruder 12 = about 450°C or more to 1000°C Temperature ($T_4$) in dry-distilling trough 3 = lower than 100° to 400°C Still another embodiment of this invention is shown in FIGS. 4, 5 and 6, where a plurality of combined means, each comprising an extruder 1 and a heating and decomposing duct 3 which are directly connected in series with each other, are connected with one dry-distilling trough 3.

Various kinds of rubber and plastic wastes each having a different melting temperature and a different heating decomposing temperature exist. Therefore, when a mixture of a number of different kind of rubber and plastic wastes are heated and decomposed at the same time, it is impossible to obtain liquid products having uniform properties. This invention has solved this problem. More precisely, according to the last-described embodiment of this invention, a number of different kinds of rubber and plastic wastes are separated individually, and the respective rubber and plastic wastes which have different melting temperatures and decomposing temperatures are separately treated in the respective combined means where the melting temperature and the decomposing temperature are appropriately controlled in accordance with the properties of the respective rubber and plastic wastes, to form a number of different decomposed products, all of which products are thereafter introduced into one dry-distilling trough where all of the decomposed products are dry-distilled at the same time. Thus, liquid materials having uniform properties can be effectively and efficiently obtained.

Furthermore, it is effective to add at least one organic peroxide to the rubber and plastic wastes to be treated, which is still another embodiment of this invention. By the addition of the organic peroxides, it is possible to accelerate the decomposition rate and to improve the decomposition efficiency and the properties of the recovered oils are more uniform.

Organic peroxides which can be used in this invention include organic hydroperoxides, perester compounds and dialkyl peroxides. Examples of suitable organic peroxides are as follows: hydroperoxides such as t-butylhydroperoxide, cumenehydroperoxide, p-menthanehydroperoxide and p-cymenehydroperoxide; peresters such as t-butylperoxybenzoate, di-(t-butylperoxy)adipate and t-butylperoxybutyrate; dialkyl peroxides such as di-α-cumylperoxide, di-t-butylperoxide and 2,5-dimethyl-2',5'-di-(t-butylperoxy)hexane and 2,5-dimethyl-2',5'-di-(t-butylperoxy)hexene-3.

A mixture of rubber or plastic wastes to be treated and at least one organic peroxide as described above is fed into an extruder and heated and melted herein. Thereafter the mixture is extruded to a decomposing means where the molten mixture is heated at a higher temperature ($T_2$) than the heating temperature ($T_1$) in the extruder to prepare decomposed products. Afterwards, the decomposed products are heated in a dry-distilling means at a lower temperature ($T_4$) than the heating temperature ($T_2$) in the decomposing means to gasify the decomposed products by dry-distillation. As compared with other methods where an organic peroxide is not added to wastes to be treated, the last-described process using the organic peroxide is more advantageous in that the decomposition rate is accelerated, the decomposition efficiency is improved and the properties of recovered oils are extremely improved.

If the amount of the residues deposited in the decomposition is large, depending upon the kind of wastes and the kind of additives, a residue-separating step is preferably added to the above described steps. As described hereinbefore, when polyethylene wastes are treated according to the present invention, some wastes include about 3% or so of carbon, and the carbon is in general deposited in the dry-distilling trough. When the wastes to be treated are crosslinked polyethylene, polystyrene, and ethylene-vinyl acetate copolymer, a metal oxide such as aluminum oxide or silicon oxide is admixed therewith in an appropriate proportion of about 1 to 200 parts per 100 parts by weight of the wastes as hereinbefore described for the purpose of accelerating the decomposition of wastes and deodorization, and in this case, a large amount of residues mainly consisting of the metal oxide used are deposited in the dry-distilling trough. When the residues of carbon or metal oxides deposited in the dry-distilling trough are removed therefrom, decomposed products are also removed together with the residues, causing a deterioration of the decomposition efficiency. In order to avoid this defect, a method including this residue-separating step is preferred, where heated and molten wastes are heated in a decomposing means at a decomposing temperature ($T_2$) to separate the decomposed products from the residues, the residues are heated in a residue removal means at even higher temperature ($T_3$) than the heating temperature ($T_2$) in the decomposing means to remove the residues from the removal means while the decomposed products are introduced into a dry-distilling means, and the decomposed products are heated in the dry-distilling means at a lower temperature ($T_4$) than the heating temperature ($T_2$) in the decomposing means to gasify them by dry-distillation, and thereafter the thus dry-distilled products are cooled in a cooling means to separate liquid materials from gaseous products.

In the method of this invention, the proportion of the organic peroxide to plastic wastes is in general preferably about 0.1 to 20 parts by weight of the organic peroxide to 100 parts by weight of the plastic wastes.

For example, the following combinations are illustrative:

About 1 to 3 parts by weight of di-α-cumylperoxide to 100 parts by weight of low density polyethylene About 0.5 to 1 part by weight of t-butylhydroperoxide to 100 parts by weight of high density polyethylene About 0.1 to 0.5 part by weight of t-butylperoxybenzoate to 100 parts by weight of ethylene-vinyl acetate copolymer About 10 to 20 parts by weight of di-t-butylperoxide to 100 parts by weight of ethylene-propylene rubber The proportion of organic peroxide to the rubber and plastic wastes is varied depending upon the kind of rubber and plastic compositions.

It is also effective in the method of this invention to add at least one white inorganic filler to wastes treated to increase the decomposition rate and the decomposition efficiency and to improve the uniformity of the properties of the recovered oils, which is still a further embodiment of this invention.

Examples of white inorganic fillers which can be used in this invention are talc (magnesium silicate, $MgO \cdot SiO_2$), clay (aluminum silicate, $Al_2O_3 \cdot 2SiO_2$), dolomite (magnesium calcium carbonate), diatomaceous earth (silicic acid hydrate, $SiO_2$) and alumina ($Al_2O_3$).

When plastic wastes containing various kinds of halogen components such as polyvinyl chloride and chlorinated polyethylene are treated, or when fire retardant polyethylene resins containing halogen-containing compounds are to be treated, basic metal salts and metal hydroxides are preferred as the white inorganic filler. In conventional methods for treatment of plastic wastes containing halogens, the halogen components contained in the decomposed gaseous products are introduced into a tower to recover the halogen components as hydrochloric acid, etc., or introduced into a neutralizing tower to neutralize them with an alkali in order to prevent environmental pollution. However, these conventional methods are defective in that the apparatus must be large-scaled, expenses for initial equipment are high, and the treatment of recovered products such as hydrochloric acid is not easy.

However, when basic metal salts or metal hydroxides are used as a white inorganic filler in the method of this invention, the hydrogen halides such as HCl generated are solidified as metal halides such as calcium chloride or magnesium chloride. Accordingly, the above described complicated steps in the conventional methods can be markedly reduced or omitted. Examples of basic metal salts and metal hydroxides which can be used in this invention are calcium carbonate, calcium hydroxide, calcium sulfate, magnesium carbonate, magnesium hydroxide, magnesium sulfate, zinc sulfate, sodium carbonate and aluminum hydroxide.

Plastic wastes containing the above described white inorganic filler(s) are fed in an extruder and heated and melted therein, and then the molten wastes are extruded into a decomposing means where they are heated at a higher temperature than the heating temperature in the extruder to form the decomposed products. Thereafter the decomposed products are heated in a dry-distilling means at a lower temperature than the heating temperature in the decomposing means to gasify the products by dry-distillation. As compared with other methods where no white inorganic filler is added to the wastes treated, this method using the white inorganic fillers is more advantageous in that the decomposition rate is accelerated, the decomposition efficiency is improved and the properties of recovered oils are markedly improved. In particular, the decomposed products are deodorized and recovered oils having more uniform properties can be obtained.

If the amount of residues deposited in the decomposition is large, depending upon the kind of wastes and the kind of additive, it is preferred to add a residue-separating step to the above described steps as described hereinbefore.

In the method of this invention, the proportion of white inorganic filler added to plastic wastes is in general about 1 to 200 parts by weight of white inorganic filler to 100 parts by weight of the plastic wastes. In particular, the proportion of basic metal salt or metal hydroxide to halogen-containing plastics is preferably 5 to 200 parts by weight of the filler to 100 parts by weight of the plastic wastes.

For example, the following combinations are illustrative:

About 5 to 10 parts by weight of talc (magnesium silicate) as a white inorganic filler to 100 parts by weight of low density polyethylene About 1 to 5 parts by weight of clay (aluminum silicate) to 100 parts by weight of high density polyethylene About 50 parts by weight of diatomaceous earth to 100 parts by weight of ethylene-vinyl acetate copolymer About 100 to 200 parts by weight of alumina to 100 parts by weight of ethylene-propylene rubber Suitable proportions of combinations of halogen-containing plastics and white inorganic fillers are as follows:

About 50 to 100 parts by weight of calcium carbonate or about 100 to 200 parts by weight of calcium hydroxide to 100 parts by weight of polyvinyl chloride About 5 to 10 parts by weight of calcium carbonate to 100 parts by weight of vinyl chloride-vinyl acetate copolymer The proportion of the white inorganic filler to the rubber and plastic wastes is varied, depending upon the kind of the rubber and plastic wastes. Most rubber and plastic compositions already contain white inorganic fillers, and it is preferred to previously analyze these wastes in an appropriate manner whereby a more accurate proportion of the filler to be added to the wastes can be determined.

The present invention will be explained in greater detail with reference to the following Examples, Comparative Examples and Referential Examples. It is to be noted that this invention is not to be construed in any way as being limited to only the illustrated Examples. Unless otherwise indicated, all parts and percents are by weight.

COMPARATIVE EXAMPLE 1

A low density polyethylene was put in a pressure container (capacity: 1 liter), and the polyethylene was heated, melted, decomposed and dry-distilled therein at the same time while heating at 400°C with an external heating means. The liquid components in the decomposed products were removed from one end of the container, and the composition of the products were examined. As a result, it was found that the products consisted of 30% of a light fraction having a boiling point of 150°C or below, 30% of a middle fraction having a boiling point of 150° to 250°C and 40% of a heavy fraction having a boiling point of 250°C or above, hereinafter "a light fraction," "a middle fraction" and "a heavy fraction", for brevity.

In the same manner, the polyethylene was liquefied at a heating temperature of 600°C, and products consisting of 40% of a light fraction, 30% of a middle fraction and 30% of a heavy fraction were obtained. All of these fractions had a strong bad odor.

COMPARATIVE EXAMPLE 2

A low density polyethylene which had been heated and melted at 200°C was fed in the same pressure container as in Comparative Example 1, and decomposed and dry-distilled therein at the same time while heating at 400°C with an external heating means. The liquid components in the decomposed products were removed from one end of the container and the composition of the products was examined. The products consisted of 30% of a light fraction, 30% of a middle fraction and 40% of a heavy fraction. All of these fractions had a strong bad odor.

As shown in the above Comparative Examples 1 and 2, the recovered liquid components obtained according to conventional methods consist of compositions over broad range of from a light fraction having a fairly low flash point to waxes having a high pour point, and recovered oils having such a broad composition are unsuitable for practical use having a poor additional value. For example, a combustion test was carried out with respect to each of the obtained light fraction, middle fraction and heavy fraction, and the results were as follows. When the light fraction having a low flash point was used with an ordinary burner, some problems occurred. The middle fraction corresponding to kerosene and light oil can be used with an ordinary burner. The heavy fraction being waxy and having a high pour point is difficult to use at an ordinary temperature.

EXAMPLE 1

Using an apparatus as shown in FIG. 1 where the extruder was a single spindle screw-type extruder (diameter: 50mm$\phi$), the length of the decomposing duct was 1m and the capacity of the dry-distilling trough was 1m$^3$, a low density polyethylene was continuously extruded, pyrolyzed and liquefied according to the method of this invention.

The temperature in the extruder was set as follows:
Hopper (raw material inlet): 50°C
First Cylinder: 150°C
Second Cylinder: 250°C
Third Cylinder: 350°C The polyethylene was fed in an amount of 100g/min. The temperature in the decomposing duct and the temperature in the dry-distilling trough were set as shown in the following Table 1. Under these conditions, the polyethylene was pyrolyzed and liquified according to the method of this invention. The composition of the liquid component obtained is shown in Table 1 also.

Table 1

| Run No. | Temperature in Decomposing Duct (°C) | Temperature in Dry-distilling Trough (°C) | Liquid Component Composition | | |
|---|---|---|---|---|---|
| | | | Light Fraction (%) | Middle Fraction (%) | Heavy Fraction (%) |
| Comparative Example 3 | 300–350 | 300–350 | 10 | 20 | 70 |
| Comparative Example 4 | 400–450 | 400–450 | 30 | 40 | 30 |
| Comparative Example 5 | 300–350 | 400–450 | 20 | 30 | 40 |
| Comparative Example 6 | 300–350 | 450–500 | 35 | 35 | 30 |
| Example 1–1 | 400–450 | 300–350 | 10 | 70 | 20 |
| Example 1–2 | 550–600 | 300–350 | 10 | 80 | 10 |
| Example 1–3 | 550–600 | 250–300 | 10 | 85 | 5 |
| Example 1–4 | 800–900 | 250–300 | 15 | 80 | 5 |

In Comparative Example 3 above, temperatures in the extruder, decomposing duct and dry-distilling trough all were substantially the same, and the liquid component obtained mainly consisted of a waxy fraction. It is noticed that the decomposition was not complete.

In Comparative Example 4, the temperatures in the decomposing duct and dry-distilling trough were the same, and the liquid component obtained broadly consisted of a light fraction, a middle fraction and a heavy fraction.

In Comparative Examples 5 and 6, the temperature of the dry-distilling trough was higher than the temperature in the the decomposing duct, and the results were similar to those of Comparative Example 4.

In Examples 1—1, 1–2, 1–3 and 1–4, decomposed oils mainly consisting of a middle fraction were obtained.

EXAMPLE 2

Using the same apparatus as described in Example 1, various kinds of resin were continuously extruded, pyrolyzed and liquefied according to the method of this invention. The results obtained are shown in the following Table 2.

C–3: Temperature in third cylinder

The resins used (shown in Table 2 above) were resin compositions.

From the results in Table 2, it can be understood that liquid components mainly consisting of a middle fraction are obtained from every resin according to the method of this invention. Each resin used in these examples is one taken from their respective wastes, and for some resin residues separated in the decomposition.

EXAMPLE 3

Using the same apparatus as described in Example 1, a plastic mixture of 60% of polyethylene, 25% of polyvinyl chloride, 12% of polystyrene and 3% of polypropylene, each resin being a resin composition, was continuously extruded, pyrolyzed and liquefied under the same conditions as in Example 2–3, and liquid components of 60% of a middle fraction, 30% of a light fraction and 10% of a heavy fraction were obtained.

EXAMPLE 4

Using an apparatus as shown in FIG. 1 where the extruder was a double spindle screw-type extruder (diameter: 115mmφ), the length of the decomposing duct was 1.5m and the capacity of the dry-distilling Table 2

| Run No. | Resin Type | Temperature in Extruder (°C) | | | | Temperature in Decomposing Duct (°C) | Temperature in Dry-distilling Trough (°C) | Composition of Liquid Component | | |
|---|---|---|---|---|---|---|---|---|---|---|
| | | H | C-1 | C-2 | C-3 | | | Light Fraction (%) | Middle Fraction (%) | Heavy Fraction (%) |
| 2–1 | High Density Polyethylene | 50 | 150 | 250 | 350 | 550–600 | 300–350 | 10 | 85 | 5 |
| 2–2 | Polypropylene | 50 | 150 | 250 | 350 | 550–600 | 300–350 | 10 | 80 | 10 |
| 2–3 | Crosslinked Polyethylene | 50 | 200 | 300 | 350 | 750–800 | 350–400 | 15 | 80 | 5 |
| 2–4 | Polystyrene | 50 | 150 | 200 | 250 | 550–600 | 300–350 | 20 | 70 | 10 |
| 2–5 | Polyvinyl Chloride | * | 120 | 150 | 200 | 550–600 | 200–250 | 30 | 60 | 10 |
| 2–6 | Polymethylacrylate | 100 | 200 | 300 | 350 | 500–550 | 300–350 | 20 | 60 | 20 |
| 2–7 | Nylon-6 | 100 | 200 | 300 | 350 | 550–600 | 300–350 | 20 | 60 | 20 |
| 2–8 | Ethylene-Propylene Rubber | 50 | 200 | 300 | 350 | 550–600 | 300–350 | 20 | 70 | 10 |
| 2–9 | Styrene-Butadiene Rubber | 50 | 200 | 300 | 350 | 500–550 | 300–350 | 20 | 60 | 20 |

Remarks:
*: Ordinary temperature
Feeding rate of raw materials: 100 g/min
Rotating rate of extruder: 40 rpm
H: Temperature in hopper
C–1: Temperature in first cylinder
C–2: Temperature in second cylinder trough was 1m³, a crosslinked polyethylene was pyrolyzed and liquefied according to the method of this invention. The crosslinked polyethylene used as a raw material was one removed from a 22KV crosslinked polyethylene cable and pulverized to a size of about 5–10mm. The raw material was fed to the extruder at a rate of 200g/min. The rotating rate of the extruder was set so as to correspond to the feeding speed.

The temperature in the extruder was set as follows:
Hopper: 50°C
First Cylinder: 200°C
Second Cylinder: 300°C
Third Cylinder: 350°C The temperature in the decomposing duct was 700°–750°C and the temperature in the dry-distilling trough was 350°–400°C. After the treatment, the cross-linked polyethylene was observed to be fully pyrolyzed and liquefied. Liquid components obtained consisted of 10% of a light fraction, 80% of a middle fraction and 10% of a heavy fraction.

EXAMPLE 5

Using an apparatus as shown in FIG. 1 where the extruder was a single spindle two-stage screw-type extruder (first-stage screw: 115mm$\phi$, second-stage screw: 90mm$\phi$), having a length of the decomposing duct of 2m and a capacity of the dry-distilling trough of 1 m$^3$, a crosslinked polyethylene was pyrolyzed and liquefied according to the method of this invention. The crosslinked polyethylene used as the raw material was the same as for the sample as in Example 3. The temperature in the extruder was set as follows:
First-stage Screw Hopper: 50°C
First-stage Screw Cylinder: 200°C
First Cylinder of Second-stage Screw: 300°C
Second Cylinder of Second-stage Screw: 350°C The temperature in the decomposing duct was 650°–700°C and the temperature in the dry-distilling trough was 300°–350°C. The liquid components obtained consisted of 10% of a light fraction, 85% of a middle fraction and 5% of a heavy fraction.

As is apparent from the results in the above Examples, when rubber and plastic wastes are continuously extruded, pyrolyzed and liquefied according to the method of this invention, recovered oils having uniform property (or mainly consisting of a middle fraction) can be obtained.

The apparatus of this invention is small in size and extremely compact, as compared with conventional pyrolyzing and liquefying apparatus, which is one advantage of this invention.

EXAMPLE 6

Using an apparatus as shown in FIG. 1 where the extruder is a single spindle screw-type extruder (diameter: 50mm$\phi$), the length of the decomposing duct was 1 m and the capacity of the dry-distilling trough was 1 m$^3$, a low density polyethylene was continuously extruded, pyrolyzed and liquefied according to the method of this invention.

The temperature in the extruder was set as follows:
Hopper (raw material inlet): 50°C
First Cylinder: 150°C
Second Cylinder: 250°C
Third Cylinder: 350°C The feeding rate of the polyethylene raw material was 100g/min. The kind and the feeding rate of active gas are shown in the following Table 3. The temperataure in the decomposing duct and that in the dry-distilling trough are also shown in Table 3. Under these conditions, the polyethylene was pyrolyzed and liquefied according to the method of this invention. The liquid components obtained were examined and the composition thereof is also shown in Table 3.

Run No. 1 mainly consisted of a waxy heavy fraction, with a somewhat bad odor. This is because the decomposition of the raw material was not completed.

Run No. 2 which was treated under the same heating conditions as for Run No. 1 with the exception that oxygen gas was introduced during decomposition, mainly consisted of a middle fraction, being free from a bad odor. Comparing Run No. 3 with Run No. 4, Run No. 5 with Run No. 6, and Run No. 7 with Run No. 8, it is observed that when the active gas was introduced during the decomposition, liquid components without a bad odor and having a more uniform property could be obtained, whereas when an active gas was not introduced, the liquid components obtained had a somewhat bad odor.

Table 3

| Run No. | Temperature in Decomposing Duct (°C) | Active Gas and Feeding Rate | Temperature in Dry-distilling Trough (°C) | Composition of Liquid Component | | | Presence of Bad Odor |
|---|---|---|---|---|---|---|---|
| | | | | Light Fraction (%) | Middle Fraction (%) | Heavy Fraction (%) | |
| 1 | 300–350 | None | 300–350 | 10 | 20 | 70 | Somewhat observed |
| 2 | 300–350 | Oxygen gas, 10 liter/min at 1 atm | 300–350 | 10 | 60 | 30 | Not observed |
| 3 | 400–450 | None | 400–450 | 30 | 40 | 30 | Somewhat observed |
| 4 | 400–450 | Ozone gas 5 liter/min at 1 atm | 400–450 | 10 | 80 | 10 | Not observed |
| 5 | 550–600 | None | 300–350 | 10 | 60 | 30 | Somewhat observed |
| 6 | 550–600 | Air 15 liter/min at 1 atm | 250–300 | 10 | 85 | 5 | Not observed |
| 7 | 800–900 | None | 300–350 | 10 | 80 | 10 | Somewhat observed |
| 8 | 800–900 | Hydrogen gas 10 liter/min at 1 atm | 250–300 | 15 | 80 | 5 | Not observed |

EXAMPLE 7

Using the same apparatus as described in Example 6, various kinds of resins were continuously extruded, pyrolyzed and liquefied according to the method of this invention. The results obtained are shown in the following Table 4. The feeding rate of the respective raw material was 100g/min. In this Table 4, H is the temperature in the hopper of the extruder, C–1 is the temperature in the first cylinder of the extruder, C–2 is the temperature in the second cylinder of the extruder, and C-3 is the temperature in the third cylinder of the extruder.

It is observed from the results in Table 4 that liquid components mainly consisting of a large amount of a middle fraction and being free from bad odor could be obtained from every resin. The resin used in Table 4 was a resin composition which was taken from the respective wastes. Separated residues were obtained from some of the resins during decomposition.

linked polyethylene was observed to be fully pyrolyzed and liquefied. The liquid components obtained consisted of 10% of a light fraction, 85% of a middle fraction and 10% of a heavy fraction. Each fraction was free from any bad odor.

EXAMPLE 10

Using an apparatus as shown in FIG. 2 where the extruder was a single spindle two-stage screw-type extruder (first-stage screw: 115mm$\phi$, second-stage screw:

Table 4

| Run No. | Resin Type | Temperature in Extruder (°C) | | | | Temperature in Decomposing Duct (°C) | Active Gas and Feeding Rate | Temperature in Dry-distilling Trough (°C) | Composition of Liquid Component (%) | | | Presence of bad odor |
|---|---|---|---|---|---|---|---|---|---|---|---|---|
| | | H | C-1 | C-2 | C-3 | | | | Light Fraction | Middle Fraction | Heavy Fraction | |
| 1 | High Density polyethylene | 50 | 150 | 250 | 350 | 550–600 | Oxygen 10 l/min | 300–350 | 10 | 90 | 0 | None |
| 2 | Polypropylene | 50 | 150 | 250 | 350 | 550–600 | Oxygen 10 l/min | 300–350 | 10 | 85 | 5 | None |
| 3 | Crosslinked Polyethylene | 50 | 200 | 300 | 350 | 750–800 | Oxygen 10 l/min | 350–400 | 5 | 90 | 5 | None |
| 4 | Polystyrene | 50 | 150 | 200 | 250 | 550–600 | Ozone 7 l/min | 300–350 | 10 | 80 | 10 | None |
| 5 | Polyvinyl Chloride | * | 120 | 150 | 200 | 550–600 | Air 15 l/min | 200–250 | 20 | 70 | 10 | None |
| 6 | Polymethyl Acrylate | 100 | 200 | 300 | 350 | 550–600 | Oxygen 10 l/min | 300–350 | 10 | 85 | 5 | None |
| 7 | Nylon-6 | 100 | 200 | 300 | 350 | 550–600 | Oxygen 10 l/min | 300–350 | 15 | 75 | 10 | None |
| 8 | Ethylene Propylene Rubber | 50 | 200 | 300 | 350 | 550–600 | Oxygen 10 l/min | 300–350 | 10 | 80 | 10 | None |
| 9 | Styrene Butadiene Rubber | 50 | 200 | 300 | 350 | 550–600 | Oxygen 10 l/min | 300–350 | 10 | 80 | 10 | None |

Remarks: * Ordinary temperature

EXAMPLE 8

Using the same apparatus as described in Example 6, a plastic mixture consisting of resin compositions of 60% of polyethylene, 25% of polyvinyl chloride, 12% of polystyrene and 3% of polypropylene was continuously extruded, pyrolyzed and liquefied under the same conditions as in Example 7-3. The liquid component obtained consisted of 60% of a middle fraction, 30% of a light fraction and 10% of a heavy fraction, and this component was quite free from any bad odor.

EXAMPLE 9

Using an apparatus shown in FIG. 2 where the extruder was a double spindle screw-type extruder (diameter: 115mm$\phi$), the length of the decomposing duct was 1.5m and a capacity of the dry-distilling trough was 1 m³, a crosslinked polyethylene was pyrolyzed and liquefied according to the method of this invention. The crosslinked polyethylene used as a raw material was one removed from a 22KV crosslinked polyethylene cable and pulverized to a size of about 5–10mm. The raw material was fed into the extruder at a rate of 200g/min. The rotating rate of the extruder was set so as to correspond to the feeding rate. The temperature in the extruder was set as follows:
  Hopper: 50°C
  First Cylinder: 200°C
  Second Cylinder: 300°C
  Third Cylinder: 350°C
The temperature in the decomposing duct was 700°–750°C and the temperature in the dry-distilling trough was 350°–400°C. Oxygen was introduced through the active gas inlet. After treatment, the crosslinked 90mm$\phi$), the length of the decomposing duct was 2m and the capacity of the dry-distilling trough was 1 m³, a crosslinked polyethylene was pyrolyzed and liquefied according to the method of this invention. The crosslinked polyethylene used was the same kind of sample as described in Example 9. The temperature in the extruder was set as follows:
  First-stage Screw Hopper: 50°C
  First-stage Screw Cylinder: 200°C
  First Cylinder of Second-stage Screw: 300°C
  Second Cylinder of Second-stage Screw: 350°C
The temperature in the decomposing duct was 650°–700°C and the temperature in the dry-distilling trough was 300°–350°C. Under these conditions, the polyethylene raw material was pyrolyzed and liquefied according to the method of this invention. The feeding rate of the raw material was 250g/min. Oxygen gas was fed through the active gas inlet at a feeding rate of 15 liter/min. The liquid components obtained consisted of 5% of a light fraction, 90% of a middle fraction and 5% of a heavy fraction. All fractions were free from any bad odor.

COMPARATIVE EXAMPLE 3

Using an apparatus as shown in FIG. 1 where the extruder was a single spindle screw-type extruder (diameter: 50mm$\phi$), the length of the decomposing duct was 1 m and the capacity of the dry-distilling trough was 1 m³, a plastic mixture of resin compositions of 30% of polyethylene, 25% of polyvinyl chloride, 25% of polystyrene and 20% of polypropylene was continuously extruded, pyrolyzed and liquefied.

The temperature in the extruder was set as follows:
  Hopper (raw material inlet): 50°C First Cylinder: 150°C
Second Cylinder: 250°C
Third Cylinder: 350°C The feeding rate of the plastic mixture was 100g/min. The temperature in the decomposing duct was 550°–600°C and the temperature in the dry-distilling trough was 400°–450°C. After treatment, liquid components consisting of 30% of a light fraction, 50% of a middle fraction and 20% of a heavy fraction were obtained.

EXAMPLE 11

Using an apparatus as shown in FIGS. 1 and 4 where the first extruder was a double spindle screw-type extruder (diameter: 115 mm$\phi$), the length of the decomposing duct connected therewith was 1.5m, the second extruder was a single spindle screw-type extruder (diameter: 115mm$\phi$), the length of the decomposing duct connected therewith was 1.5m, and the capacity of the dry-distilling trough was 2 m$^3$, a crosslinked polyethylene was fed into the first extruder and a low density polyethylene was fed into the second extruder, and these raw materials were continuously pyrolyzed and liquefied. The crosslinked polyethylene and low density polyethylene used as raw materials were materials removed from 22KV insulated cables and pulverized to a size of about 5–10mm. The feeding rate of each of these raw materials into the respective extruders was 100g/min, and the rotating rate of the respective extruders was set so as to correspond to the respective feeding rates of the raw materials. The temperatures in the extruders, decomposing ducts and dry-distilling trough were as follows:

First Extruder:
H: 50°C
C-1: 200°C
C-2: 300°C
C-3: 350°C
First Decomposing Duct: 750°–800°C
Second Extruder:
H: 50°C
C-1: 150°C
C-2: 250°C
C-3: 350°C
Second Decomposing Duct: 550°–600°C
Dry-distilling Trough: 350°–400°C The liquid components obtained consisted of 15% of a light fraction, 80% of a middle fraction and 5% of a heavy fraction.

COMPARATIVE EXAMPLE 4

The low density polyethylene and the crosslinked polyethylene as described in the Example 11 were blended in a weight proportion of 1:1, and the mixture was fed into the first extruder as described in Example 11 and continuously pyrolyzed and liquefied. The liquid components obtained consisted of 40% of a light fraction, 50% of a middle fraction and 10% of a heavy fraction. In the same manner, the mixture was fed into the second extruder and continuously pyrolyzed and decomposed. The liquid components obtained consisted of 20% of a light fraction, 50% of a middle fraction and 30% of a heavy fraction.

EXAMPLE 12

Using an apparatus as shown in FIGS. 1 and 5, where the first extruder was a single spindle two-stage screw-type extruder (first-stage screw: 115mm$\phi$, second-stage screw: 90mm$\phi$), the length of the decomposing duct connected therewith was 2m, the second extruder was a single spindle screw-type extruder (90mm$\phi$), the length of the decomposing duct connected therewith was 2m, the third extruder was a double spindle screw-type extruder (115mm$\phi$), the length of the decomposing duct connected therewith was 2m, and the capacity of the dry-distilling trough was 3 m$^3$, a polyvinyl chloride resin composition was fed into the first extruder, a polystyrene resin composition into the second extruder and a high density polyethylene into the third extruder, and these raw materials were continuously pyrolyzed and liquefied according to the method of this invention. Each of these raw materials was a material removed from their respective wastes. The feeding rate of each raw material was 100g/min, and the rotating rate of each extruder was set so as to correspond to the feeding rate. The temperatures in the respective extruders, decomposing ducts and dry-distilling trough were as follows:

First Extruder:
First-stage Screw:
H: 50°C
C-1: 50°C
C-2: 200°C
Second-stage Screw:
C-1: 250°C
C-2: 250°C
First Decomposing Duct: 450°–500°C
Second Extruder:
H: 50°C
C-1: 150°C
C-2: 200°C
C-3: 250°C
Second Decomposing Duct: 550°–600°C
Third Extruder:
H: 50°C
C-1: 150°C
C-2: 250°C
C-3: 350°C
Third Decomposing Duct: 600°–650°C
Dry-distilling Trough: 350°–650°C The liquid components obtained consisted of 20% of a light fraction, 75% of a middle fraction and 5% of a heavy fraction.

COMPARATIVE EXAMPLE 5

A polyvinyl chloride resin, a polystyrene and a high density polyethylene as described in Example 12 were blended in a weight proportion of 1:1:1, and the mixture was fed into the first extruder of an apparatus as described in Example 12 and continuously pyrolyzed and liquefied. The liquid components obtained consisted of 30% of a light fraction, 30% of a middle fraction and 40% of a heavy fraction.

In the same manner, the mixture was fed into the second extruder of an apparatus as described in Example 12 and continuously pyrolyzed and liquefied. The liquid components obtained consisted of 30% of a light fraction, 40% of a middle fraction and 30% of a heavy fraction.

Also in the same manner, the mixture was fed into the third extruder of an apparatus described in Example 12 and continuously pyrolyzed and liquefied. The liquid components obtained consisted of 30% of a light fraction, 50% of a middle fraction and 20% of a heavy fraction.

EXAMPLE 13

Using an apparatus as shown in FIGS. 1 and 6 where the first extruder was a single spindle two-stage screw type extruder (first-stage screw: 115mm$\phi$, second-stage screw: 90mm$\phi$), the length of the decomposing duct connected therewith was 2m, the second extruder was a single spindle screw-type extruder (90mm$\phi$), the length of the decomposing duct connected therewith was 2m, the third extruder was a double spindle screw-type extruder (115mm$\phi$), the length of the decomposing duct connected therewith was 2m, the fourth extruder was a single spindle screw-type extruder (115mm$\phi$), the length of the decomposing duct connected therewith 2m, and the capacity of the dry-distilling trough was 3 m$^3$, a polyvinyl chloride resin was fed into the first extruder, an ethylene-propylene rubber composition into the second extruder, a crosslinked polyethylene composition into the third extruder and a polypropylene resin into the fourth extruder and these resins were continuously pyrolyzed and liquefied according to the method of this invention. The respective raw materials used were each taken from their respective wastes. The feeding rate of the respective resin was 100g/min, and the rotation rate of the respective extruder was set so as to correspond to the respective feeding rate.

The temperatures in the respective extruders, decomposing ducts and dry-distilling trough were as follows:

First Extruder:
First-stage Screw:
  H: 50°C
  C-1: 150°C
  C-2: 200°C
Second-stage Screw:
  C-1: 250°C
  C-3: 250°C
First Decomposing Duct: 450°–500°C
Second Extruder:
  H: 50°C
  C-1: 200°C
  C-2: 300°C
  C-3: 350°C
Second Decomposing Duct: 550°–600°C
Third Extruder:
  H: 50°C
  C-1: 200°C
  C-2: 300°C
  C-3: 350°C
Third Decomposing Duct: 700°–750°C
Fourth Extruder:
  H: 50°C
  C-1: 150°C
  C-2: 250°C
  C-3: 350°C
Fourth Decomposing Duct: 550°–600°C
Dry-distilling Trough: 350°–400°C The liquid components obtained consisted of 15% of a light fraction, 80% of a middle fraction and 5% of a heavy fraction.

EXAMPLE 14

Using an apparatus as shown in FIG. 1, where the extruder was a single spindle screw-type extruder (50mm$\phi$), the length of the decomposing duct was 1m and the capacity of the dry-distilling trough was 1 m$^3$, a low density polyethylene to which was added an organic peroxide was continuously extruded, pyrolyzed and liquefied according to the method of this invention.

The temperature in the extruder was set as follows:
Hopper (raw material inlet): 50°C
First Cylinder: 150°C
Second Cylinder: 250°C
Third Cylinder: 350°C The feeding rate of the polyethylene raw material was 100g/min. The kind and the amount of organic peroxide used are shown in the following Table 5. The temperature in the decomposing duct and that in the dry-distilling trough are also shown in Table 5. The composition of liquid components obtained is given in Table 5.

Table 5

| Run No. | Temperature in Decomposing Duct (°C) | Organic Peroxide and Amount Used | Temperature in Dry-distilling Trough (°C) | Composition of Liquid Component (%) | | | Presence of Bad Odor |
|---|---|---|---|---|---|---|---|
| | | | | Light Fraction (%) | Middle Fraction (%) | Heavy Fraction (%) | |
| 1 | 400–450 | None | 300–350 | 10 | 50 | 40 | Somewhat observed |
| 2 | 400–450 | Di-α-cumyl-peroxide 5 g/min | 300–350 | 10 | 70 | 20 | Not observed |
| 3 | 550–600 | None | 300–350 | 10 | 60 | 30 | Somewhat observed |
| 4 | 550–600 | t-Butylhydro-peroxide 1 g/min | 300–350 | 10 | 80 | 10 | Not observed |
| 5 | 800–900 | None | 300–350 | 10 | 80 | 10 | Somewhat observed |
| 6 | 800–900 | t-Butylper-oxybenzoate 0.5 g/min | 300–350 | 10 | 85 | 5 | Not observed |

In Table 5, Run Nos. 2, 4, and 6 contain an organic peroxide, and Run Nos. 1, 3 and 5 do not contain any organic peroxide.

Run No. 1 product mainly consisted of a waxy heavy fraction, having a somewhat bad odor. This is because the decomposition of the raw material was not complete. Run No. 2 product which was treated under the same heating conditions as in Run No. 1 with the exception that di-α-cumylperoxide was introduced as an organic peroxide during the decomposition, mainly consisted of a middle fraction, which was free from any bad odor. Comparing Run No. 3 with Run No. 4, and Run No. 5 with Run No. 6, it is observed that when the organic peroxide was introduced during the decomposition, liquid components without a bad odor and having more uniform properties could be obtained, whereas when an organic peroxide was not introduced, the liquid components obtained have a somewhat bad odor.

EXAMPLE 15

Using an apparatus as shown in FIG. 1 where the extruder was a single spindle screw-type extruder (50mm$\phi$), the length of the decomposing duct was 1 m and the capacity of the dry-distilling trough was 1 m$^3$, a low density polyethylene containing a white inorganic filler was continuously extruded, pyrolyzed and liquefied according to the method of this invention.

The temperature in the extruder was set as follows:
Hopper (raw material inlet): 50°C
First Cylinder: 150°C
Second Cylinder: 250° C
Third Cylinder: 350° C The feeding rate of the polyethylene was 100g/min, and the kind and the amount of white inorganic filler used are shown in the following Table 6. The temperature in the decomposing duct and the temperature in the dry-distilling trough are also given in Table 6. The liquid products obtained were examined and the composition thereof is given in Table 6.

Hopper (raw material inlet): 50°C
First Cylinder: 150°C
Second Cylinder: 200°C
Third Cylinder: 250°C The feeding rate of the vinyl chloride wastes was 100g/min, and that of the calcium carbonate was 100g/min. The temperature in the decomposing duct was 500°–550°C and the temperature in the dry-distilling trough was 300°–350°C. No hydrogen chloride gas was removed from the gas removal outlet.

For comparison, the same treatment was carried out with the exception that no calcium carbonate was employed. In the latter case, a large amount of pungent hydrogen chloride gas was exhausted from the gas removal outlet.

While the invention has been described in detail and with reference to specific embodiments thereof, it will be apparent to one skilled in the art that various changes and modifications can be made therein without departing from the spirit and scope thereof.

What is claimed is:

Table 6

| Run No. | Temperature in Decomposing Duct (°C) | White Inorganic Filler and Amount Used | Temperature in Dry-distilling Trough (°C) | Composition of Liquid Component | | | Presence of Bad Odor |
|---|---|---|---|---|---|---|---|
| | | | | Light Fraction (%) | Middle Fraction (%) | Heavy Fraction (%) | |
| 1 | 400–450 | None | 300–350 | 10 | 50 | 40 | Somewhat observed |
| 2 | 400–450 | Talc(magnesium silicate) 10 g/min | 300–350 | 10 | 60 | 30 | Not observed |
| 3 | 550–600 | None | 350–400 | 15 | 65 | 20 | Somewhat observed |
| 4 | 550–600 | Clay(aluminum silicate) 20 g/min | 350–400 | 10 | 75 | 15 | Not observed |
| 5 | 550–600 | Alumina 10 g/min | 350–400 | 10 | 80 | 10 | Not observed |
| 6 | 800–900 | None | 350–400 | 15 | 75 | 10 | Somewhat observed |
| 7 | 800–900 | Dolomite 50 g/min | 350–400 | 10 | 80 | 10 | Not observed |
| 8 | 800–900 | Diatomaceous earth 20 g/min | 350–400 | 10 | 80 | 10 | Not observed |

In Table 6, Run Nos. 2, 4, 5, 7 and 8 contained a white inorganic filler, and Run Nos. 1, 3 and 6 did not contain a white inorganic filler.

Run No. 1 product mainly consisted of a waxy heavy fraction, having a somewhat bad odor. This was because the decomposition of the raw material was not complete. Run No. 2 product which was treated under the same heating conditions as in Run No. 1 with the exception that talc was incorporated in the raw material as a white inorganic filler, mainly consisted of a middle fraction, which was free from any bad odor.

Comparing Run No. 3 with Run Nos. 4 and 5, and Run No. 6 with Run Nos. 7 and 8, it is observed that when the white inorganic filler was incorporated in the raw material, liquid components without a bad odor and having more uniform properties could be obtained, whereas when a white inorganic filler was not incorporated, the liquid components obtained had a somewhat bad odor.

EXAMPLE 16

Using the same apparatus as described in Example 15, wastes of vinyl chloride film for agricultural use, to which calcium carbonate was added as a white inorganic filler, were continuously extruded, pyrolyzed and liquefied according to the method of this invention.

The temperature in the extruder was set as follows:

1. A method for treatment of rubber and plastic wastes comprising in series the steps of:
   1. heating and melting rubber and plastic wastes in an extruder at a temperature ($T_1$) to knead and melt the wastes, and extruding the molten wastes in a molten state into a decomposing zone,
   2. heating the molten wastes in said decomposing zone at a temperature ($T_2$) higher than the heating temperature ($T_1$) in said extruder to form decomposed products, and passing the decomposed products to a dry-distilling zone,
   3. heating the decomposed products in the dry-distilling zone at a lower temperature than the heating temperature ($T_2$) in the decomposing zone to gasify said products by dry-distillation, and
   4. passing the dry-distilled products to a cooling zone for cooling the dry-distilled products to separate liquid materials from gaseous materials.

2. A method for treatment of rubber and plastic wastes, comprising in series the steps of:
   1. heating and melting rubber and plastic wastes in an extruder at a temperature ($T_1$) to knead and melt the wastes, and extruding the molten wastes into a decomposing zone,
   2. heating the molten wastes in said decomposing zone at a temperature ($T_2$) higher than the heating temperature ($T_1$) in said extruder to form decomposed products and residues of said molten wastes, 3. transferring the decomposed products into a dry-distilling zone while simultaneously heating the residues of said molten wastes in a residue removal zone at a temperature ($T_3$) higher than the heating temperature ($T_2$) in the decomposing zone to remove the residues from the removal zone, 4. heating the decomposed products in said dry-distilling zone at a temperature ($T_4$) lower than the heating temperature ($T_2$) in the decomposing zone to gasify said products by dry-distillation, and 5. passing the dry-distilled products to a cooling zone for cooling the dry-distilled products to separate liquid materials from gaseous materials.

3. A method for treatment of rubber and plastic wastes, comprising in series the steps of:

1. passing rubber and plastic wastes materials to a plurality of extruders, 2. heating and melting rubber and plastic wastes in each extruder at a temperature ($T_1$) to knead and melt the wastes, and extruding the molten wastes from said plurality of extruders into a plurality of decomposing zones, 3. heating the molten wastes in said decomposing zones at a temperature ($T_2$) higher than the heating temperature in said extruders to form decomposed products, and passing the decomposed products to a dry-distilling zone, 4. heating the decomposed products in a dry-distilling zone at a lower temperature than the heating temperature ($T_2$) in the decomposing zones to gasify said products by dry-distillation, and 5. passing the dry-distilled products to a cooling zone for cooling the dry-distilled products to separate liquid materials from gaseous materials.

4. The method as claimed in claim 1 including the step of introducing an active gas into the decomposing zone to improve the efficiency of decomposition.

5. The method as claimed in claim 2 including the step of introducing an active gas into the decomposing zone to improve the efficiency of decomposition.

6. The method as claimed in claim 3 including the step of introducing an active gas into the decomposing zone to improve the efficiency of decomposition.

7. The method as claimed in claim 1 wherein said rubber and plastic wastes contain at least one organic peroxide to accelerate the decomposition rate.

8. The method as claimed in claim 2 wherein said rubber and plastic wastes contain at least one organic peroxide to accelerate the decomposition rate.

9. The method as claimed in claim 3 wherein said rubber and plastic wastes contain at least one organic peroxide to accelerate the decomposition rate.

10. The method as claimed in claim 4 wherein said rubber and plastic wastes contain at least one organic peroxide to accelerate the decomposition rate.

11. The method as claimed in claim 1 wherein said rubber and plastic wastes contain at least one white inorganic filler to increase decomposition efficiency and improve the uniformity of recovered oils.

12. The method as claimed in claim 2 wherein said rubber and plastic wastes contain at least one white inorganic filler to increase decomposition efficiency and improve the uniformity of recovered oils.

13. The method as claimed in claim 3 wherein said rubber and plastic wastes contain at least one white inorganic filler to increase decomposition efficiency and improve the uniformity of recovered oils.

14. The method as claimed in claim 4 wherein said rubber and plastic wastes contain at least one white inorganic filler to increase decomposition efficiency and improve the uniformity of recovered oils.

15. The method as claimed in claim 5 wherein said rubber and plastic wastes contain at least one white inorganic filler to increase decomposition efficiency and improve the uniformity of recovered oils.

* * * * *